United States Patent Office 3,342,838
Patented Sept. 19, 1967

3,342,838
PROCESS FOR PRODUCTION OF GLUTAMIC ACID AND INTERMEDIATES
Gentaro Noyori, Hidemoto Kurokawa, and Hidehiro Okazaki, Tokyo, Japan, assignors to The Noguchi Institute, Tokyo, Japan, an incorporated body of Japan
No Drawing. Filed Dec. 18, 1962, Ser. No. 245,420
15 Claims. (Cl. 260—343.6)

The present invention relates to a novel process for producing glutamic acid. More particularly, it relates to a novel process for the synthesis of glutamic acid from furfural.

There have so far been proposed various processes for the synthesis of glutamic acid, for example, those starting from acrylic acid esters, acrylonitrile, acrolein, cyclopentadiene, furfural, etc. Among these materials, furfural is one of the most inexpensive and is produced from corn-cobs, oats hulls, or others in large scale.

The known processes for the synthesis of glutamic acid starting from furfural involve (1) the one in which furfural is converted to malein aldehydic acid, then to succin aldehydic acid, and finally to glutamic acid through Strecker's reaction; (2) the one in which furfural is oxidized to 2-furoic acid, which is then treated with chlorine in an alcohol and hydrolyzed with the resulting hydrochloric acid to form α-ketoglutaric acid, and then the acid is converted to glutamic acid by aminative reduction; and (3) the one in which furfural is converted to glutamic acid via tetrahydrofurfuryl alcohol, dihydropyrane, chlorinated pyrane, and α-chloroglutaric acid. In the processes (1) and (2), a photochemical reaction or chlorination in an alcohol solvent are needed. Hence, there is a disadvantage in that the alcohol tends to be lost by solvent loss or by conversion into an unrecoverable form in the reaction system. In the processes (2) and (3), chlorine is wastefully used, which is not entered in the final product. This fact is a deleterious burden for the synthesis of glutamic acid and caused a disadvantage in commercial viewpoint.

Thus, an object of the invention is to provide a novel process for preparing glutamic acid by use of furfural as starting material. Another object of the invention is to provide a process for preparing glutamic acid by use of easily available and low-priced materials, excepting furfural, such as oxygen, hydrogen, oxidizing agent (for example, nitric acid), and ammonia, without use of alcohols and chlorine. Still another object of the invention is to provide a novel process of the synthesis of glutamic acid which is free from the disadvantages in the previous processes, and which comprises the most reasonable combination of steps heretofore not tried. Other objects and features of the invention would be apparent as the description proceeds.

The process of the invention comprises a series of steps from furfural to glutamic acid. In the first step, furfural is oxidized to 2-furoic acid. In the second, the acid is hydrogenated to 2-tetrahydrofuroic acid. In the third, the latter is oxidized to α-hydroxyglutaric acid or γ-butyrolactone-γ-carboxylic acid. In the fourth, the resulting acid is aminated and then hydrolyzed to glutamic acid. These 4 steps are represented by the following formula.

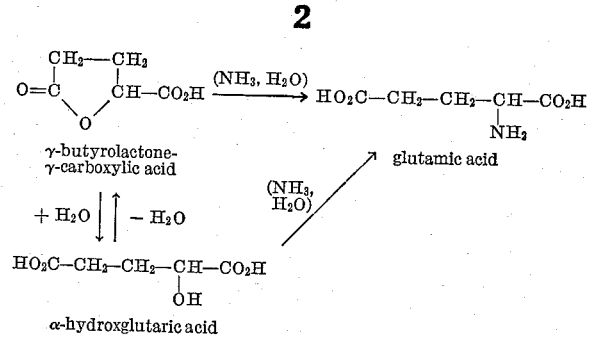

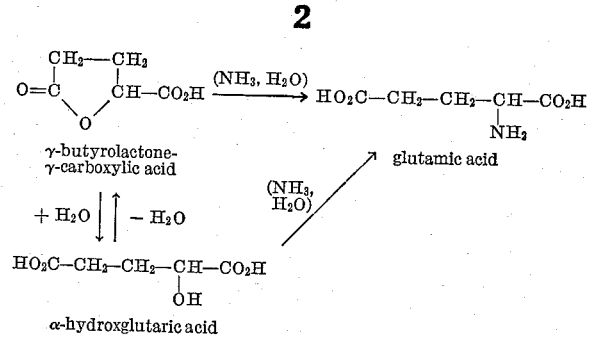

It has been already known that glutamic acid can be produced by amination of α-hydroxyglutaric acid or γ-butyrolactone-γ-carboxylic acid. However, there has not been proposed the synethesis of α-hydroxyglutaric acid and γ-butyrolactone-γ-carboxylic acid with moderate prices, therefore the production of glutamic acid via these acids was considered not to be successful. Namely, the known processes for the synthesis of α-hydroxyglutaric acid and γ-butyrolactone-γ-carboxylic acid are that in which glutamic acid dissolved in hydrochloric acid is treated with sodium nitrite and that in which α-chloroglutaric acid is treated with water or an aqueous alkaline solution.

Now, the present inventors have discovered the fact that α-hydroxyglutaric acid or γ-butyrolactone-γ-carboxylic acid can be prepared by oxidation of 2-tetrahydrofuroic acid. Since 2-tetrahydrofuroic acid can readily be produced by hydrogenation of 2-furoic acid which is in turn readily obtained by oxidation of furfural, a novel process comprising a series of steps for the production of glutaric acid from furfural has now been accomplished.

The first step of the present process is to oxidize furfural to yield 2-furoic acid. The condition is well known to those skilled in the art. For example, furfural is oxidized with oxygen or air in the presence of catalyst. More concretely, furfural is oxidized by passing of air or oxygen therethrough in a solution of alkali metal hydroxide or calcium hydroxide in the presence of silver oxide alone or with copper oxide, to form 2-furoic acid in a yield of 95% or higher.

The second step of the present process is hydrogenation of 2-furoic acid according to the conditions known to those skilled in the art. 2-furoic acid may be hydrogenated in its ester or salt form or in its free acid state, in an aqueous or an alcoholic solution, by use of a hydrogenating catalyst such as Raney's nickel or cobalt or others, in an excellent yield.

The third step of the process is the oxidation of 2-tetrahydrofuroic acid. The oxidizing agent may be nitric acid, nitrogen peroxide, a permanganate salt, a bichromate salt. Or, the oxidation may be effected with oxygen or oxygen-containing gas such as air in the presence of cobalt, manganese, iron, cerium, lead, copper, chromium or other metal salt of an organic acid such as stearic, naphthenic, acetic or other acid. Among those, oxidation with nitric acid is the most effective and yields α-hydroxyglutaric acid or γ-butyrolactone-γ-carboxylic acid in a yield higher than 80%. α-hydroxyglutaric acid can easily be changed to γ-butyrolactone-γ-carboxylic acid by heating or other procedure. While, γ-butyrolactone-γ-carboxylic acid can be changed to α-hydroxyglutaric acid by heating its aqueous solution in the presence of an acid or an alkali. The inventors have separated and proved the structure of the product resulting from the oxidation of 2-tetrahydrofuroic acid and addition of zinc carbonate to the oxidation product gives zinc α-hydroxylutarate further addition of an acid and concentration in vacuo of the oxidation product at a low temperature yields α-hydroxyglutaric acid, and neutralization and distillation of the oxidation product gives γ-butyrolactone-γ-carboxylic acid. Both α-hydroxyglutaric acid and γ-butyrolactone-γ-carboxylic acid can be aminated in the fourth step of the process under the same condition. For example, when a mixture of the both acids is heated with aqueous ammonia at a temperature higher than 200° C., pyrrolidonecarboxylic acid is formed, which in turn yields glutamic acid by hydrolysis. Accordingly, there is no need of separation of the acids, for the purpose of synthesizing glutamic acid in the present process.

The fourth step is amination of α-hydroxyglutaric acid or γ-butyrolactone-γ-carboxylic acid, or a mixture thereof. The amination can be effected according to the known procedure, for example, by heating the acid with liquid ammonia, alcoholic ammonia, or aqueous ammonia, followed by hydrolysis with an acid or an alkali. The most excellent yield is obtained when the acid is heated with aqueous ammonia at a temperature higher than 200° C.

In carrying out the process of the invention, it is more advantageous to employ the intermediate obtained in each step for the next step without specific isolation and purification procedures. Thus, the product in the first step, i.e., 2-furoic acid, obtained in the form of an aqueous solution of the sodium or calcium salt, may be directly employed for the hydrogenation of the second step merely by filtration of the catalyst. Similarly, the product in the second or third step may be directly employed for the third or fourth step, respectively, since α,ω-dihydroxyvaleric acid which may be produced as by-product in the second step can yield α-hydroxyglutaric acid or γ-butyrolactone-γ-carboxylic acid in the third step by the same procedure used to convert the 2-tetrahydrofuroic acid. Also, a viscous polyester produced as by-product in the third step can yield glutamic acid by amination directly or after acid-treatment according to the procedure of the fourth step.

According to the present invention glutamic acid can be produced from furfural by the following sequence of steps, oxidation, hydrogenation, oxidation, and amination without particular isolation and purification of the essential intermediates yielded in each step, and with the utilization of the by-product in each step. Thus, glutamic acid can be produced from furfural in a higher yield than that expected rom each individual step.

The process of the present invention will be described more concretely with reference to the following examples, which are, however, set forth merely by way of illustration and not by way of limitation.

*Example 1*

A concentrated aqueous solution containing 2.2 g. of silver nitrate and 26.6 g. of copper sulfate was added hot to 5% sodium hydroxide solution, and the precipitate formed was filtered, washed with water, and dried. The resulting Ag$_2$O-CuO catalyst (10 g.) was suspended in 400 cc. of water. An oxygen stream was blown into the suspension at 50° C. at the rate of 4 to 6 liters per minute, while 50 g. of furfural and aqueous 48% sodium hydroxide solution in equimolar amount to furfural were added separately and continuously to the suspension over 4 hours. After the oxidation reaction was over, the catalyst was filtered off, and the filtrate was neutralized with sulfuric acid and then cooled, thereby to yield 43.3 g. of crystalline 2-furoic acid. The mother liquor separated from the crystals was concentrated to yield additional 12.7 g. of crystalline 2-furoic acid. The total yield from furfural amounts 96.0%.

In the oxidation of furural with the Ag$_2$O-CuO catalyst, use of calcium hydroxide as the alkali instead of caustic soda gives the same result. When an alcohol solvent is used in the oxidation reaction, the resulting sodium 2-furoate is precipitated along with the catalyst, which can be separated easily.

*Example 2*

A solution of 56 g. of 2-furoic acid in 280 cc. of water was neutralized with 20 g. of sodium hydroxide to yield 20% aqueous sodium 2-furoate solution. After addition of about 5.6 g. of Raney's nickel, the solution was placed in an autoclave having 500 cc. of inner volume, and hydrogenated at initial hydrogen pressure of 100 kg./cm.$^2$, at 120° C. for 1 hour, during which time, hydrogen was supplied twice. After the autoclave was cooled, the reaction mass was separated from the catalyst, acidified with 50% sulfuric acid solution to pH 2, and continuously extracted with ethyl ether for 10 hours. The ether extract was dried over anhydrous sodium sulfate and evaporated to remove ethyl ether. The residue was distilled in vacuo to yield 54 g. of 2-tetrahydrofuroic acid fraction at 120–122° C./10 mm. Hg, the yield being 93.0%.

Similarly to the hydrogenation of aqueous sodium 2-furoate solution described above, an ester of 2-furoic acid or an alcoholic solution of free 2-furoic acid may be hydrogenated by use of Raney's nickel. Thus, hydrogenation of ethyl 2-furoate gave ethyl 2-tetrahydrofuroate boiling at 78° C./11 mm. Hg in 92.5% yield, while, hydrogenation of an ethyl alcohol solution of 2-furoic acid gave a mixture of tetrahydrofuroic acid and its ethyl ester in 90.1% yield.

*Example 3*

Into 66.8 g. of fuming nitric acid (d.=1.5, HNO$_3$ 94.1%) placed in an Erlenmeyer flask and agitated vigorously, 29 g. (¼ mol) of 2-tetrahydrofuroic acid was slowly dropped over about 40 minutes. During the addition, the flask was cooled in a water bath at 40° to 45° C., so as to keep the temperature of the reaction mixture at 50° to 55° C. The temperature of 50° C. was kept until 6 hours from the commencement of the oxidation reaction, thereafter, the reaction mixture was cooled, and blown with air to purge the dissolved gas. The reaction mixture was diluted with distilled water to 300 cc., warmed at 60° C., and added with zinc carbonate to make the pH of the mixture 5.8, thereby zinc α-hydroxyglutarate being isolated, which is then filtered, washed with water and dried. The resulting zinc α-hydroxyglutarate,

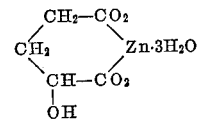

weighs 61.2 g.

The zinc salt was suspended in 500 cc. of water, and sufficient amount of hydrogen sulfide was passed therethrough, thereby to form zinc sulfide and α-hydroxyglutaric acid. The zinc sulfide was filtered and washed well with water. The filtrate and washings were combined and concentrated on an evaporating dish placed on a water bath. The evaporating residue was dissolved in acetone, and the undissolved matter was filtered off. Evaporation of acetone from the filtrate leaves 27.5 g. of γ-butyrolactone-γ-carboxylic acid, which corresponds to 84.5% yield based upon 2-tetrahydrofuroic acid. The result was confirmed by melting point, boiling point, infrared spectrum, and elementary analysis.

Fifty grams of the zinc α-hydroxyglutarate prepared as above was suspended in 100 cc. of water, and hydrogen sulfide was passed therethrough at 10° to 20° C. The zinc sulfide precipitated was filtered off, and the filtrate was concentrated in vacuo at a temperature below 25° C., thereby to leave a yellowish viscous liquid accompanying a small amount of crystals. The total residue was dissolved in actone, and any undissolved matter was filtered off. The acetone solution was dried over anhydrous sodium sulfate, and evaporated to leave 15 g. of crystalline α-hydroxyglutaric acid melting at 95–97° C.

Example 4

Into 29 g. of 2-tetrahydrofuroic acid in a flask cooled at a temperature below 0° C., 92 g. of liquid nitrogen peroxide ($N_2O_4$) was added, and the mixture was allowed to stand overnight at room temperature (about 20° C.). Then, the flask was warmed on a water bath to drive off the remaining gas. The reaction mixture was adjusted to pH 1.5 by means of sodium carbonate, and concentrated in vacuo. The residue was dissolved in actone to separate the unreacted material and γ-butyrolactone-γ-carboxylic acid from undissolved sodium nitrate. The acetone solution was distilled in vacuo to yield the following fractions:

|  | Distilling temp. | Compound | Amount, g. |
|---|---|---|---|
| Fraction I | 117–123° C./10 mm. Hg | Unreacted material | 5 |
| Fraction II | 197–200° C./8 mm. Hg | γ-butyrolactone-γ-carboxylic acid. | 18.2 |

The fraction II was identified to be the objective γ-butyrolactone-γ-carboxylic acid by infrared spectrum. The yield of γ-butyrolactone-γ-carboxylic acid, excepting 17.3% of unreacted material, was 70.5%.

Example 5

In a three-necked flask placed in a water bath at 20° C., 66.8 g. of fuming nitric acid (d.=1.5, $HNO_3$ 94.1%) was agitated vigorously, while 33.5 g. (¼ mol) of ethyl 2-tetrahydrofuroate was dropped slowly therein. The flask was kept at 25° C. by cooling so as to prevent elevation of temperature upon the addition. The dropping was completed after about 3 hours, after which the temperature was kept for about 1 hour. Under cooling, air was blown into the reaction mixture to drive the dissolved gas off. Thereafter, the mixture was adjusted to pH 1.6 with sodium carbonate while being cooled, thereby to convert the remaining nitric acid to sodium nitrate. The mixture was concentrated in vacuo to dryness, and the residue was extracted by ethyl alcohol, and the extract was distilled to remove ethyl alcohol, followed by distillation of the residue in vacuo. The fractions obtained were as follows:

|  | Distilled temp. | Compound | Yield, g. |
|---|---|---|---|
| Fraction I | 76–78° C./10 mm. Hg | Unreacted material | 1.7 (5.07%) |
| Fraction II | 144–145° C./10 mm. Hg | Ethyl γ-butyrolactone-γ-carboxylate. | 25.5 (64.6%) |
| Fraction III | 195–200° C./8 mm. Hg | γ-butyrolactone-γ-carboxylic acid. | 3.5 (10.7%) |

Each fraction was recognized by boiling point, infrared spectrum, elementary analysis, etc. The yield of combined ethyl γ-butyrolactone-γ-carboxylate and its free acid, excepting 5.07% of the unreacted material, was 79.3%.

Example 6

To a solution of 20 g. of 2-tetrahydrofuroic acid in 300 cc. of acetone cooled at 15° to 20° C., 36 g. of postassium permanganate was slowly added portionwise over about 2 hours under vigorous agitation. After about 1 hour from the completion of the addition of potassium permanganate, the reaction mixture turns colorless and clear. The isolated manganese dioxide was filtered off, and the solvent in the filtrate was recovered by distillation. A distillation in vacuo yields 2.3 g. of a fraction boiling at 195–199° C./8 mm. Hg, along with a small amount of the unreacted material and a lower boiling fraction.

The result was identified by infrared spectrum.

Example 7

To a solution of 20 g. of 2-tetrahydrofuroic acid in 70 cc. of water kept at about 50° C., a solution of 33.8 g. of potassium bichromate and 45 g. of sulfuric acid in 150 g. of water was added within about 1 hour. After the completion of the addition, the mixture was kept at a temperature of 90° to 100° C. for 1 hour, and then cooled. The mixture was neutralized by addition of ammonia to a weakly alkaline condition. The precipitate formed was filtered off, and the filtrate was acidified to pH 1.5 with hydrochloric acid, heated at 70–80° C., and added with zinc carbonate. The precipitate formed was filtered hot, and the filtrate was cooled, thereby 3.7 g. of crystals was obtained, which was identified by infrared spectrum to be zinc α-hydroxyglutarate,

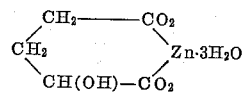

Example 8

To a solution of 29 g. of 2-tetrahydrofuroic acid in 100 cc. of glacial acetic acid, 2 g. of cobalt acetate was added, and the mixture was heated at 105–110° C., while oxygen gas was blown therethrough over 7 hours. At the commencement of the reaction, a small amount of acetaldehyde was added along with the oxygen gas. After the completion of the reaction, the reaction mixture was distilled in vacuo to recover acetic acid, then 20.2 g. of unreacted material at 103–116° C./8 mm. Hg, and finally 1.2 g. of a fraction boiling at 193–200° C./8 mm. Hg, which crystallizes partially after a while. The crystals were proved to be γ-butyrolacetone-γ-carboxylic acid by infrared spectrum.

Example 9

In an autoclave, a mixture of 15 g. of γ-butyrolactone-γ-carboxylic acid and 40 cc. of 28% aqueous ammonia was heated at 260° C. for 4 hours. After a distillation of the excess aqueous ammonia, 100 cc. of 20% hydrochloric acid was added to the reaction mixture, and the resulting mixture was refluxed for 2 hours. The excess hydrochloric acid was distilled off, and the residue was dissolved in water to make the volume 250 cc. In analysis of a portion of the aqueous solution shows formation 15.1 g. of glutamic acid, which corresponds to the yield of 88.8% based upon γ-butyrolactone-γ-carboxylic acid. The aqueous solution was decolorized with active carbon, concentrated to dryness, dissolved in a small amount of water, added with a sodium hydroxide solution to pH 3.2, and allowed to stand in a cool place. Crystals were isolated, which were filtered and dried. The resulting DL-glutamic acid monohydrate weighed 12.3 g., which had melting point of 182–184° C. (decomposed) and purity of 99.2%. The mother liquor was concentrated to yield further 2 g. of DL-glutamic acid monohydrate. The resulting compound was identified by mixed melting point, elementary analysis, and infrared spectrum.

*Example 10*

A solution prepared, similarly as in Example 3, by dropping 29 g. of 2-tetrahydrofuroic acid into 66.8 of fuming nitric acid and then passing air to the reaction mixture to remove the dissolved gas, was adjusted to pH 2 by addition of sodium carbonate, and then mixed with 160 cc. of 28% aqueous ammonia. The mixture was heated at 260° C. for 4 hours, and, after cooling, the excess aqueous ammonia was distilled off. The remaining solution was mixed with 200 cc. of 20% hydrochloric acid and the mixture was refluxed for 2 hours. The excess hydrochloric acid was distilled off, and the residue was dissolved in water. An anaylsis of the aqueous solution shows formation of 27.8 g. of glutamic acid, which corresponds to 75.6% yield based upon 2-tetrahydrofuroic acid. The aqueous solution was treated similarly as in Example 9 to yield 26.5 g. of crystalline DL-glutamic acid monohydrate.

*Example 11*

From the aqueous sodium 2-furoate solution prepared similarly as in Example 1 by oxidation of 50 g. of furfural, the catalyst was filtered off. The filtrate was added with about 6 grams of Raney's nickel and hydrogenated in an autoclave at the initial hydrogen pressure of 100 kg./cm.$^2$ at 120° C. for 2 hours. After being allowed to cool, the catalyst was filtered off, and the filtrate was adjusted to pH 2 with 50% sulfuric acid and then extracted with ethyl ether for 10 hours by means of a continuous extractor. The extract was dried over anhydrous sodium sulfate and evaporated to remove ethyl ether. The residue weighed 58 g., which was then slowly added into 133.6 g. of fuming nitric acid (d. 1.5, HNO$_3$ 94.1%) at 25° C. The mixture was allowed to stand for 1 hour at 50° C., and then blown with air to remove the dissolved gas. The mixture was adjusted to pH 2 with sodium carbonate, added with 160 cc. of 28% aqueous ammonia, and heated at 260° C. for 4 hours. After being allowed to cool, the ammonia was distilled off, and the residue was refluxed with 200 cc. of 20% hydrochloric acid for 2 hours. After a distillation of the excess hydrochloric acid, the residue was dissolved in water. An analysis of the aqueous solution shows formation of 55.1 g. of glutamic acid, which corresponds to 71.95% yield based upon furfural. The aqueous solution was decolorized with active carbon, adjusted to pH 3.2 with sodium hydroxide solution, and allowed to stand in a cooled place to yield 49.5 g. of crystalline DL-glutamic acid monohydrate, melting at 182–184° C. (decomposed). The compound was identified by mixed melting point, elementary analysis, and infrared spectrum.

What we claim is:

1. A process for preparing glutamic acid from furfural, which comprises oxidizing furfural to yield 2-furoic acid, hydrogenating the 2-furoic acid to yield 2-tetrahydrofuroic acid, oxidizing the 2-tetrahydrofuroic acid with an oxidizing agent selected from the group consisting of nitric acid, dinitrogen tetroxide, potassium permanganate, potassium bichromate, sodium bichromate, chromium trioxide, and free oxygen-containing gas, said oxidizing with free oxygen-containing gas being conducted in the presence of a catalyst selected from the group consisting of cobalt and manganese stearates, naphthenates and acetates, to yield at least one compound of the group consisting of α-hydroxyglutaric acid and γ-butyrolactone-γ-carboxylic acid, aminating the product of the latter oxidation and hydrolyzing the thus-animated product to yield glutamic acid.

2. A process for preparing at least one compound of the group consisting of α-hydroxyglutaric acid and γ-butyrolactone-γ-carboxylic acid, which comprises oxidizing 2-tetrahydrofuroic acid with an oxidizing agent selected from the group consisting of nitric acid, dinitrogen tetroxide, potassium permanganate, potassium bichromate, sodium bichromate, chromium trioxide, and free oxygen-containing gas, said oxidizing with free oxygen-containing gas being conducted in the presence of a catalyst selected from the group consisting of cobalt and manganese stearates, naphthenates and acetates.

3. A process according to claim 2 in which the oxidizing agent is nitric acid.

4. A process according to claim 2 in which the oxidizing agent is dinitrogen tetroxide.

5. A process according to claim 2 in which the oxidizing agent is potassium permanganate.

6. A process according to claim 2 in which the oxidizing agent is selected from the group consisting of potassium bichromate and sodium bichromate.

7. A process according to claim 2 in which free oxygen-containing gas in the presence of a catalyst selected from the group consisting of cobalt and manganese stearates, naphthenates and acetates is used for the oxidation of 2-tetrahydrofuroic acid.

8. A process according to claim 2 in which 2-tetrahydrofuroic acid is oxidized in the form of a lower alkyl ester.

9. A process for preparing at least one compound of the group consisting of α-hydroxyglutaric acid and γ-butyrolactone-γ-carboxylic acid, which comprises oxidizing 2-tetrahydrofuroic acid with fuming nitric acid at a temperature up to about 55° C.

10. A process for preparing glutamic acid from 2-tetrahydrofuroic acid, which comprises oxidizing 2-tetrahydrofuroic acid with an oxidizing agent selected from the group consisting of nitric acid, dinitrogen tetroxide, potassium permanganate, potassium bichromate, sodium bichromate, chromium trioxide, and free oxygen-containing gas, said oxidizing with free oxygen-containing gas being conducted in the presence of a catalyst selected from the group consisting of cobalt and manganese stearates, naphthenates and acetates, aminating the product of said oxidation, and hydrolyzing the thus-aminated product to yield glutamic acid.

11. A process for preparing glutamic acid from 2-tetrahydrofuroic acid, which comprises oxidizing 2-tetrahydrofuroic acid with nitric acid, aminating the product of said oxidation, and hydrolyzing the thus-aminated product to produce glutamic acid.

12. A process for preparing glutamic acid from 2-tetrahydrofuroic acid, which comprises oxidizing 2-tetrahydrofuroic acid with fuming nitric acid at a temperature up to about 55° C., aminating the product of said oxidation with aqueous ammonia at a temperature above 200° C., and hydrolyzing the thus-aminated product to produce glutamic acid.

13. A process for preparing at least one compound of the group consisting of α-hydroxyglutaric acid and α-butyrolactone-α-carboxylic acid from furfural, which comprises oxidizing furfural to yield 2-furoic acid, hydrogenating said 2-furoic acid to yield 2-tetrahydrofuroic acid, oxidizing said 2-tetrahydrofuroic acid with an oxidizing agent selected from the group consisting of nitric acid, dinitrogen tetroxide, potassium permanganate, potassium bichromate, sodium bichromate, chromium trioxide, and free oxygen-containing gas, said oxidizing with free oxygen-containing gas being conducted in the presence of a catalyst selected from the group consisting of cobalt and manganese stearates, naphthenates and acetates.

14. A process for preparing glutamic acid from furfural which comprises oxidizing furfural to produce 2-furoic acid, hydrogenating said 2-furoic acid directly without isolation and purification to produce 2-tetrahydrofuroic acid, oxidizing said 2-tetrahydrofuroic acid without isolation and purification with an oxidizing agent selected from the group consisting of nitric acid, dinitrogen tetroxide, potassium permanganate, potassium bichromate, sodium bichromate, chromium trioxide, and free oxygen-containing gas, said oxidizing with free oxygen-containing gas being conducted in the presence of a catalyst selected from the group consisting of cobalt and manganese stearates, naphthenates and acetates, aminating the product of the oxidation directly without isolation and purification, and hydrolyzing directly the thus-aminated product without isolation and purification to yield glutamic acid.

15. A process for preparing glutamic acid from furfural, which comprises oxidizing furfural to 2-furoic acid by passing a free oxygen-containing gas through furfural in a solution, said solution being selected from the group which consists of alkali metal hydroxide and calcium hydroxide, in the presence of a member selected from the group which consists of silver oxide and a mixture of silver oxide and copper oxide, hydrogenating said thus-produced 2-furoic acid to 2-tetrahydrofuroic acid in a solution selected from the group which consists of aqueous and alcoholic with hydrogen in the presence of a hydrogenation catalyst, oxidizing said 2-tetrahydrofuroic acid with fuming nitric acid at a temperature up to about 55° C., aminating the product of said oxidation with aqueous ammonia at a temperature above 200° C., and hydrolyzing the thus-aminated product to produce glutamic acid.

References Cited

UNITED STATES PATENTS

| 2,464,825 | 3/1949 | Nielson | 252—437 |
| 2,859,218 | 11/1958 | Stevens | 260—534 |
| 2,995,602 | 8/1961 | Kawai et al. | 260—534 |

FOREIGN PATENTS

| 608,539 | 9/1948 | Great Britain. |
| 610,166 | 10/1948 | Great Britain. |

OTHER REFERENCES

Dunlop et al.: The Furans, 1953, pp. 386, 388, 701 and 706.

LORRAINE A. WEINBERGER, *Primary Examiner.*

L. ZITVER, *Examiner.*

I. R. PELLMAN, V. GARNER, *Assistant Examiners.*